(12) United States Patent
Suzuki

(10) Patent No.: US 11,720,083 B2
(45) Date of Patent: Aug. 8, 2023

(54) NUMERICAL CONTROL DEVICE

(71) Applicant: FANUC CORPORATION, Yamanashi (JP)

(72) Inventor: Makoto Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 488 days.

(21) Appl. No.: 17/016,934

(22) Filed: Sep. 10, 2020

(65) Prior Publication Data

US 2021/0116887 A1    Apr. 22, 2021

(30) Foreign Application Priority Data

Oct. 18, 2019  (JP) ................................. 2019-190805

(51) Int. Cl.
 *G05B 19/4155*  (2006.01)
 *G05B 19/4093*  (2006.01)

(52) U.S. Cl.
 CPC ... G05B 19/4155 (2013.01); G05B 19/40938 (2013.01); *G05B 2219/35519* (2013.01); *G05B 2219/36204* (2013.01); *G05B 2219/36347* (2013.01); *G05B 2219/36365* (2013.01); *G05B 2219/37355* (2013.01)

(58) Field of Classification Search
 None
 See application file for complete search history.

(56) References Cited

U.S. PATENT DOCUMENTS

2016/0363925 A1* 12/2016 Oohashi ............. G05B 19/4065
2020/0401106 A1* 12/2020 Ootomo ........... G05B 19/40938

FOREIGN PATENT DOCUMENTS

JP         7-314290        12/1995

* cited by examiner

*Primary Examiner* — Sean Shechtman
(74) *Attorney, Agent, or Firm* — Wenderoth, Lind & Ponack, L.L.P.

(57) ABSTRACT

A numerical control device is intended for a machine tool that machines a workpiece using a multi-edge tool including a plurality of edges of different specifications, the numerical control device including: a tool information memory that stores edge type numbers in association with tool type numbers; a tool type-edge type selection command decoding unit that prefetches a plurality of blocks of a machining program, decodes a tool type selection command for selecting one of the tool types and/or an edge type selection command for selecting one of the edge types in the plurality of prefetched blocks, and generates internal information including the tool type selection command and/or the edge type selection command that have been decoded; and a tool selection unit that selects one tool with which the number of times of tool replacement is minimized during execution of at least the plurality of prefetched blocks.

4 Claims, 16 Drawing Sheets

FIG. 2

| TOOL NUMBER | TOOL TYPE NUMBER (T) | EDGE NUMBER | EDGE TYPE NUMBER (P) | REMAINING LIFE (NUMBER OF AVAILABLE TIMES OF USE) |
|---|---|---|---|---|
| 1 | 100 | 1 | 11 | 8 |
|   |     | 2 | 12 | 8 |
|   |     | 3 | 13 | 8 |
| 2 | 100 | 1 | 11 | 5 |
|   |     | 2 | 12 | 5 |
|   |     | 3 | 13 | 5 |
| 3 | 100 | 1 | 11 | 3 |
|   |     | 2 | 12 | 3 |
|   |     | 3 | 13 | 0 |
| 4 | 101 | 1 | 11 | 99 |
|   |     | 2 | 12 | 99 |
|   |     | 3 | 13 | 99 |
| 5 | 110 | 1 | 15 | 15 |
|   |     | 2 | 16 | 20 |
|   |     | 3 | 17 | 20 |
| 6 | 200 | — | — | 10 |
| 7 | 210 | — | — | 85 |

NUMERICAL CONTROL DEVICE

This application is based on and claims the benefit of priority from Japanese Patent Application No. 2019-190805, filed on 18 Oct. 2019, the content of which is incorporated herein by reference.

BACKGROUND OF THE INVENTION

Field of the Invention

The present disclosure relates to a numerical control device.

Related Art

There are multi-edge tools having a plurality of edges. According to a known technique, based on data indicating a life and cumulative hours of use of each edge of a multi-edge tool, a remaining life of each edge is computed when a machining operation command is outputted; and a determination is made that the multi-edge tool reaches its end-of-life if the remaining life of at least one of the edges expires. See, for example, Patent Document 1.

Patent Document 1: Japanese Unexamined Patent Application, Publication No. H07-314290

SUMMARY OF THE INVENTION

Meanwhile, there is a situation in which advantage is taken of the characteristics of the multi-edge tool such that a series of machining processes is intended to be performed using different edges of one multi-edge tool without tool replacement. In such a situation, expiration of the life of one edge results in replacement of the whole tool, whereby a cycle time is increased.

In view of the foregoing background, it has been desired to control a cycle time of machining in which a multi-edge tool is used, even if one edge of the multi-tool edge reaches its end-of-life.

One aspect of the present disclosure is directed to a numerical control device for a machine tool that machines a workpiece using a multi-edge tool including a plurality of edges of different specifications. The numerical control device includes: a tool information memory that stores edge type numbers in association with tool type numbers, the edge type numbers identifying edge types of the edges, and the tool type numbers identifying tool types of tools; a tool type-edge type selection command decoding unit that prefetches a plurality of blocks included in a machining program, decodes a tool type selection command for selecting one of the tool types in the plurality of prefetched blocks and/or an edge type selection command for selecting one of the edge types in the plurality of prefetched blocks, and generates internal information including the tool type selection command and/or the edge type selection command that have been decoded; and a tool selection unit that selects one tool with which the number of times of tool replacement is minimized during execution of at least the plurality of prefetched blocks, based on remaining lives of the edges stored on an edge-by-edge basis in the tool information memory and the internal information generated by the tool type-edge type selection command decoding unit.

According to the aspect, the cycle time of machining in which a multi-edge tool is used can be controlled even if one edge of the multi-tool edge reaches its end-of-life.

BRIEF DESCRIPTION OF THE DRAWINGS

FIG. 2 shows an example of a tool-edge data table;

FIG. 4 shows an example of a machining program;

DETAILED DESCRIPTION OF THE INVENTION

Embodiment

First, the outlines of the present embodiment will be described. In the present embodiment, a numerical control device prefetches a plurality of blocks included in a machining program, and decodes a tool type selection command for selecting a tool type in the plurality of prefetched blocks and an edge type selection command for selecting an edge type in the plurality of prefetched blocks. The numerical control device generates internal information including the tool type selection command and the edge type selection command that have been decoded. The numerical control device selects a tool with which the number of times of tool replacement is minimized during execution of at least the plurality of prefetched blocks, based on edges' remaining lives stored on an edge-by-edge basis in a tool information memory and the generated internal information.

In this way, the present embodiment can achieve the object "to control a cycle time of machining in which a multi-edge tool is used, even if one edge of the multi-edge tool reaches its end-of-life".

The outlines of the present embodiment are as above.

Next, a configuration of the present embodiment will be described in detail with reference to the accompanying drawings.

Figure 1:
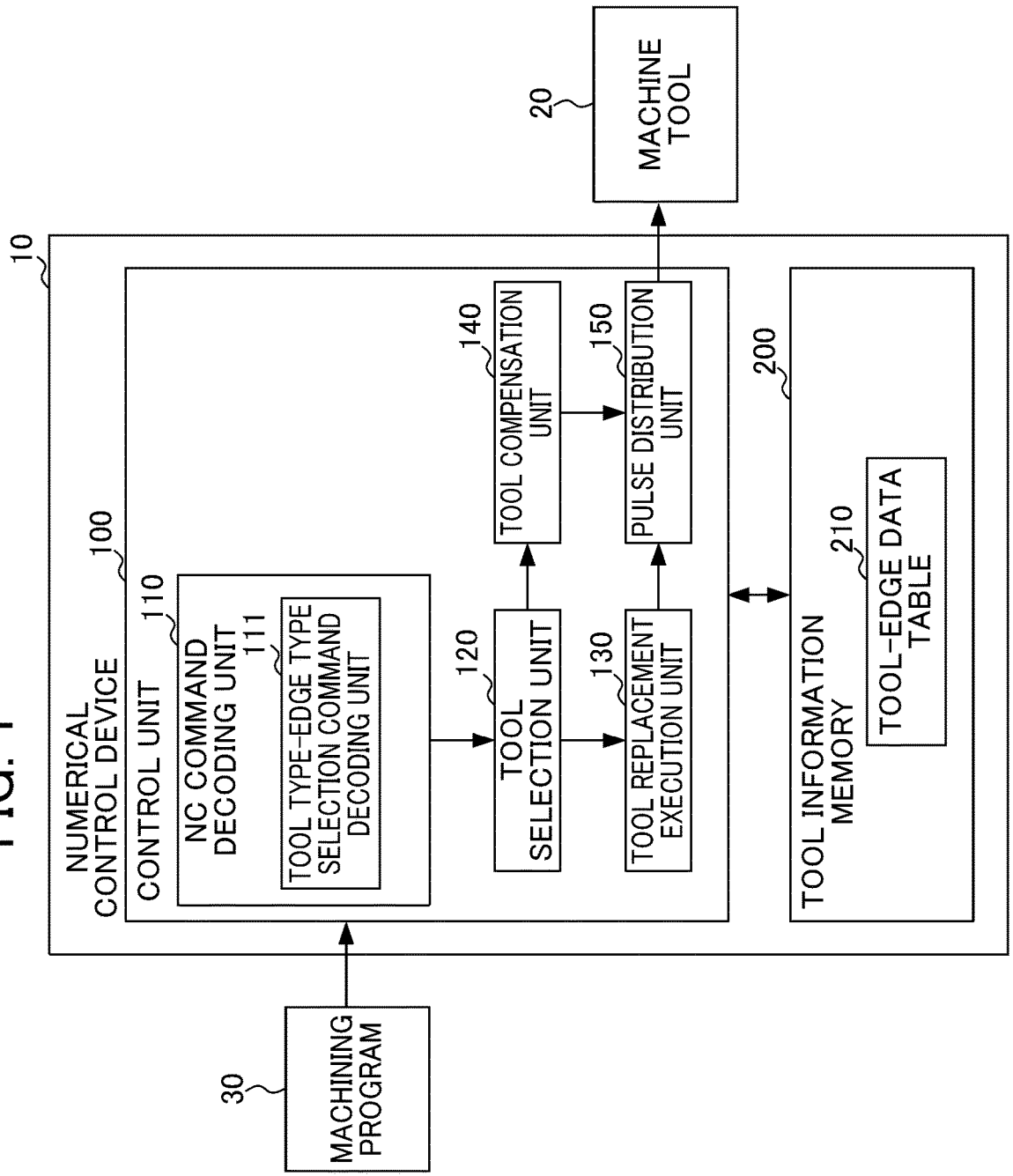
FIG. 1 is a functional block diagram showing an example of a functional configuration of a numerical control device according to an embodiment.

FIG. 1 is a functional block diagram showing an example of a functional configuration of a numerical control device according to the embodiment.

The numerical control device 10 and a machine tool 20 may be directly connected to each other via a connecting interface (not shown). The numerical control device 10 and the machine tool 20 may be connected to each other via a network (not shown) such as a local area network (LAN) or the Internet. In this case, the numerical control device 10 and the machine tool 20 include a communication unit (not shown) to communicate with each other via such a connection.

The numerical control device 10 is a numerical control device known to those skilled in the art, and generates operation commands based on control information, and transmits the generated operation commands to the machine tool 20. In this way, the numerical control device 10 controls the operation of the machine tool 20. If the machine tool 20 is a robot or the like, the numerical control device 10 may be, for example, a robot control device.

The control target of the numerical control device 10 is not limited to the machine tool 20 and a robot. The numerical control device 10 is applicable to a wide range of general industrial machines. The industrial machines include a variety of machines such as machine tools, industrial robots, service robots, forging press machines, and injection molding machines.

As shown in FIG. 1, the numerical control device 10 has a control unit 100 and a tool information memory 200. The control unit 100 has an NC command decoding unit 110, a tool selection unit 120, a tool replacement execution unit 130, a tool compensation unit 140, and a pulse distribution unit 150. The NC command decoding unit 110 has a tool type-edge type selection command decoding unit 111.

<Tool Information Memory 200>

The tool information memory 200 is constituted by a solid state drive (SSD), a hard disk drive (HDD), or the like. The tool information memory 200 stores a tool-edge data table 210.

The tool-edge data table 210 is constituted by a list of, for example, tool information about tools selectable for the machine tool 20. In addition, if the tools are multi-edge tools, the tool-edge data table 210 registers edge numbers respectively associated with the edges of each multi-edge tool, thereby ensuring an area in which information can be stored on an edge-by-edge basis. Specifically, edges that are the same in all edge attributes (machining application, a material, an amount of tool nose radius compensation, etc.) are assigned with the same edge number, and the tool-edge data table 210 registers the edges in association with the same edge number, on an edge-by-edge basis.

In respect of tools other than the multi-edge tools, the tool information memory 200 is equivalent in configuration to the conventional tool information memory since no edge number is registered.

FIG. 2 shows an example of the tool-edge data table 210.

As shown in FIG. 2, the tool-edge data table 210 has a storage area for storing tool numbers assigned in the order of registration, preset tool type numbers each indicating a tool type, edge numbers assigned to respective edges of each multi-edge tool, edge type numbers each indicating the edge type of each edge, and remaining lives (the numbers of available times of use).

The tool-edge data table 210 may have a storage area for storing, for example, a tool position offset amount for each tool (e.g., in the case of a lathe machining tool), a tool length compensation amount (e.g., in the case of a milling tool), and an amount of tool nose radius compensation.

As described earlier, the tool-edge data table 210 may store the data items assigned with tool numbers "1" to "7" in the order of registration. Further, the tool-edge data table 210 stores the data items assigned with the tool type numbers such as "100", the tool type numbers being set in advance for the tool types.

The tools denoted by tool numbers "1" to "3" are assigned with tool type number "100". This means that the tools denoted by tool numbers "1" to "3" are of the same type.

Further, the tool-edge data table 210 stores the tools denoted by tool numbers "1" to "5", along with edge numbers "1" to "3" assigned to each tool. This indicates that each of the tools denoted by tool numbers "1" to "5" is a multi-edge tool having three edges. On the other hand, the tools denoted by tool numbers "1" to "3" are assigned with tool type number "100", whereas the tool denoted by tool number "4" is assigned with tool type number "101", and the tool denoted by tool number "5" is assigned with tool type number "110". Thus, these tools are of different tool types. That is, it is indicated that the tools denoted by tool numbers "1" to "3", the tool denoted by tool number "4", and the tool denoted by tool number "5" are multi-edge tools of different types.

Figure 3A:
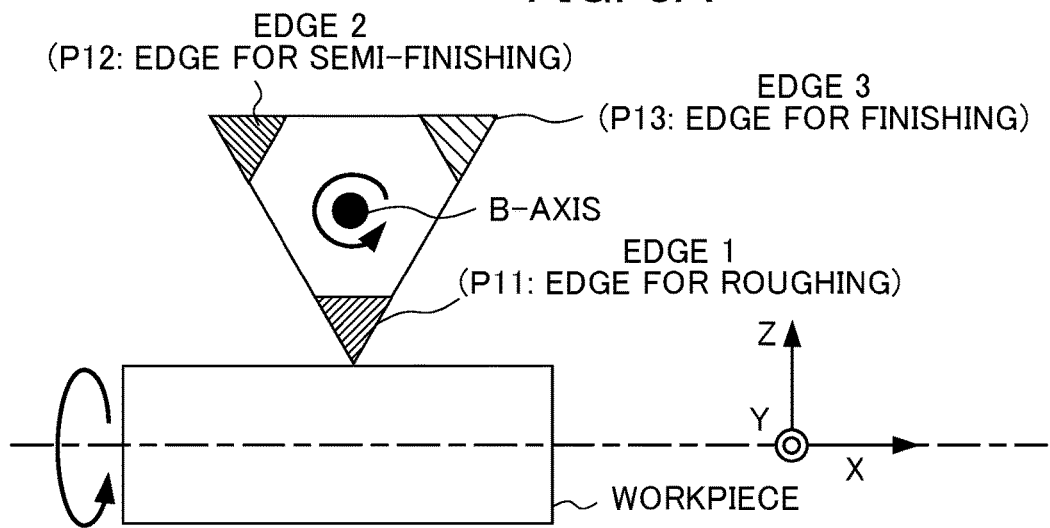
FIG. 3A is a diagram showing an example of a multi-edge tool.
Figure 3B:
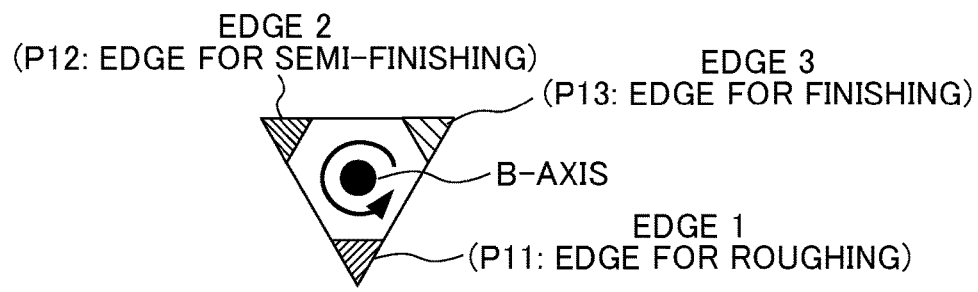
FIG. 3B is a diagram showing an example of a multi-edge tool.
Figure 3C:
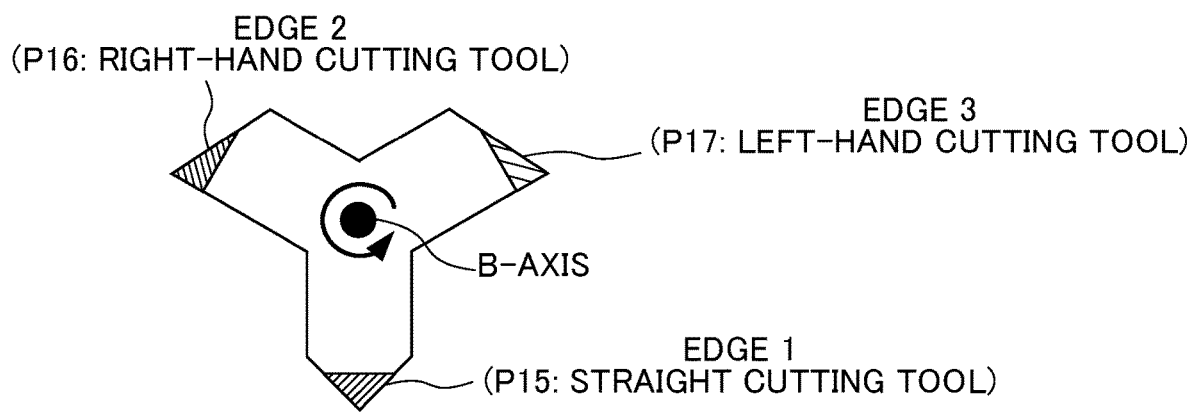
FIG. 3C is a diagram showing an example of a multi-edge tool.

FIGS. 3A to 3C are diagrams each showing an example of a multi-edge tool.

FIG. 3A shows a multi-edge tool of tool number "1", "2", or "3", and of tool type number "100". The multi-edge tool of tool type number "100" has an edge for roughing as edge number "1", an edge for semi-finishing as edge number "2", and an edge for finishing as edge number "3". Thus, the roughing, semi-finishing, and finishing can be performed continuously by rotating the B-axis multi-edge tool around a Y-axis. The edges of edge numbers "1" to "3" are assigned with edge type numbers "11" to "13" in advance.

FIG. 3B shows a multi-edge tool of tool number "4" and of tool type number "101". The multi-edge tool of tool type number "101" has the same function as of the multi-edge tool shown in FIG. 3A, but differs in tool size. Due to the difference in size, the multi-edge tool of FIG. 3B is assigned with tool type number "101" that is different from the tool type number of the multi-edge tool of FIG. 3A.

FIG. 3C shows a multi-edge tool of tool number "5" and of tool type number "110". The multi-edge tool of tool type number "110" provided with a straight cutting tool as edge number "1", a right-hand cutting tool as edge number "2", and a left-hand cutting tool as edge number "3". Thus, straight turning, right-hand turning, and left-hand turning can be performed continuously by rotating the B-axis multi-edge tool of FIG. 3C around a Y-axis. The edges of edge numbers "1" to "3" are assigned with edge type numbers "15" to "17" in advance.

As can be seen, in the tool-edge data table 210, edge type numbers "11" to "13" are stored in association with edge numbers "1" to "3" of each of the tools of tool numbers "1" to "4", and edge type numbers "15" to "17" are stored in association with edge numbers "1" to "3" of the tool of tool number "5".

The tools of tool numbers "6" and "7" are assigned with no edge number, which means that these are tools other than the multi-edge tool. For example, the tool of tool number "6" is a grooving tool assigned with tool type number "200", while the tool of tool number "7" is a parting tool assigned with tool type number "210". Therefore, in the tool-edge data table 210, the edge number cell and the edge type number cell of the rows of tool numbers "6" and "7" are blank.

Further, the tool-edge data table 210 stores remaining life (the number of available times of use) of each tool or edge. For example, as the remaining life (the number of available times of use) in the tool-edge data table 210, the maximum number of available times of use of each edge or tool is set as an initial value at the time of tool replacement or the like, and 1 is taken away from the initial value in time the edge or tool is used. Referring to the edges of the multi-edge tool of tool number "3" listed in the tool-edge data table 210 of FIG. 2, the remaining life (the number of available times of use) of edge number "3" is "0". This indicates that the edge of edge number "3" has reached its end-of-life.

Note that it is conceivable to count the life (the number of times of use) from 0 in increments of 1. In this case, the numerical control device 10 may determine whether an edge or tool has reached its end-of-life by determining whether the life (the number of times of use) has reached the maximum number of available times of use. Alternatively, as the life (the number of times of use), cumulative hours of use of a tool may be used, for example. In this case, the numerical control device 10 may determine whether a tool has reached its end-of-life by determining whether the cumulative hours of use of the tool have reached a predetermined period of time set in advance.

<Control Unit 100>

The control unit 100 has a CPU, a ROM, a RAN, a CMOS memory, and the like that are capable of communicating with each other via busses. These components are known to those skilled in the art.

The CPU is a processor for controlling the whole numeric control device 10. The CPU reads system programs and application programs stored in the ROM through the bus and controls the whole numeric control device 10 according to the system programs and the application programs. Thus, as shown in FIG. 1, the control unit 100 is configured to implement functions of the NC command decoding unit 110, the tool selection unit 120, the tool replacement execution unit 130, the tool compensation unit 140, and the pulse distribution unit 150. The RAM stores various data such as temporary calculation data and display data. The CMOS memory is backed up by a battery (not shown) and configured as a nonvolatile memory that retains a storage state even when the power supply for the numerical control device 10 is turned off.

The NC command decoding unit 110 acquires, for example, a machining program 30 generated by an external device such as a CAD/CAM device, and analyzes the acquired machining program 30.

The tool type-edge type selection command decoding unit 111 prefetches a plurality of blocks included in the machining program 30, and decodes a tool type selection command for selecting a tool type in the plurality of prefetched blocks and/or an edge type selection command for selecting an edge type in the plurality of prefetched blocks. The tool type-edge type selection command decoding unit 111 generates internal information including the decoded tool type selection command and/or the decoded edge type selection command.

Figure 4:
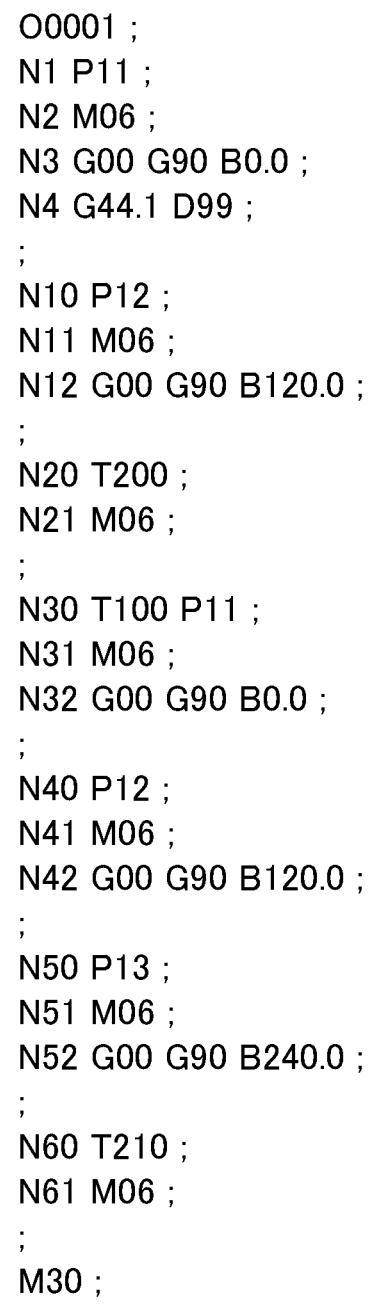

FIG. 4 shows an example of the machining program 30.

The machining program 30 shown in FIG. 4 is a program having blocks assigned with sequence numbers N1 to N60. The block of sequence number N1 selects the above-described edge assigned with edge type number "11". The block of sequence number N2 replaces a current tool with a tool selected by the tool selection unit 120 to be described later, or changes a current edge to an edge selected by the tool selection unit 120. The block of sequence number N3 positions an edge indexing axis of the selected edge of edge type number "11". The block of sequence number N4 applies a compensation amount distributed according to an angle of the selected edge.

The block of sequence number N10 selects the above-described edge with edge type number "12". The block of sequence number N11 changes a current edge to the selected edge of edge type number "12". The block of sequence number N12 positions an edge indexing axis of the selected edge of edge type number "12". The block of sequence number N20 selects the above-described tool of tool type number "200". The block of sequence number N21 replaces a current tool with the selected tool of tool type number "200".

The block of sequence number N30 selects the above-described tool of tool type number "100" and the above-described edge of edge type number "11". The block of sequence number N31 replaces a current tool with the selected tool of tool type number "100". The block of sequence number N32 positions an edge indexing axis of the selected edge of edge type number "11". The block of sequence number N40 selects the edge of edge type number "12". The block of sequence number N41 changes a current edge to the selected edge of edge type number "12". The block of sequence number N42 positions an edge indexing axis of the selected edge of edge type number "12". The block of sequence number N50 selects the edge of edge type number "13". The block of sequence number N51 changes a current edge to the selected edge of edge type number "13". The block of sequence number N52 positions an edge indexing axis of the selected edge of edge type number "13". The block of sequence number N60 selects the tool of tool type number "210". The block of sequence number N61 replaces a current tool with the selected tool of tool type number "210". Then, the block "M30" ends the machining program 30.

From the machining program 30 shown in FIG. 4, the tool type-edge type selection command decoding unit 111 prefetches, for example, a set of blocks up to the block of sequence number N20 or N60 that includes only the tool type selection command (i.e., the block selecting a tool other than the multi-edge tool). Specifically, the tool type-edge type selection command decoding unit 111 first prefetches the blocks of sequence numbers N1 to N20. The tool type-edge type selection command decoding unit 111 then extracts, from the prefetched blocks, the blocks of sequence numbers N1, N10, and N20 that-include at least a tool type selection command or an edge type selection command. The block of sequence number N1 includes only the edge type selection command indicating edge type number "11". Therefore, the tool type-edge type selection command decoding unit 111 records "0" which indicates the absence of a tool type select ion command in the first T[1] of an array table T, as the data of the tool type designated by the tool type selection command. On the other hand, the tool type-edge type selection command decoding unit 111 records "11" in the first P[1] of an array table P, as the data of the edge type designated by the edge type selection command. Hereinafter, the array table T is also referred to as "tool type T", and the array table P is also referred to as "edge type P".

Next, in the block of sequence number N10, the tool type-edge type selection command decoding unit 111 records "0" in the second tool type T[2], and records "12" in the second edge type P[2]. In the block of sequence number N20, which includes only the tool type selection command indicating tool type number "200", the tool type-edge type selection command decoding unit 111 records "200" in the third tool type T[3] and "0" indicating no edge type selection command in the third edge type P[3].

In the blocks of sequence numbers N1 to N20, the tool type-edge type selection command decoding unit 111 generates the following internal information:

T[1]=0, P[1]="11";

T[2]=0, P[2]="12"; and

T[3]="200", P[3]="0". The tool type-edge type selection command decoding unit 111 outputs the generated internal information to the tool selection unit 120 to be described later.

Next, the tool type-edge type selection command decoding unit 111 prefetches the blocks of sequence numbers N30 to N60 of the machining program 30. At this time, the tool type-edge type selection command decoding unit 111 may initialize the array tables T and P.

As in the case of the blocks of sequence numbers N1 to N20, the tool type-edge type selection command decoding unit 111 generates the following internal information in the blocks of sequence numbers N30 to N60:

T[1]="100", P[1]="11";

T[2]="0", P[2]="12";

T[3]="0", P[3]="13"; and

T[4]="210", P[4]"0". The tool type-edge type selection command decoding unit 111 outputs the generated internal information to the tool selection unit 120 to be described later.

The tool selection unit 120 selects one tool with which the number of times of tool replacement is minimized during the execution of at least the plurality of prefetched blocks, based on the edges' remaining lives stored on an edge-by-edge basis in the tool information memory 200 and the internal information generated by the tool type-edge type selection command decoding unit 111.

Specifically, except when replacing a current tool with a tool other than the multi-edge tools, the tool selection unit 120 selects one multi-edge tool such that a series of machining processes is performed with different edges of the same multi-edge tool without the need for tool replacement, while taking advantage of the characteristics of the multi-edge tool. In other words, based on the internal information resulting from the decoding of the machining program 30, the tool selection unit 120 determines whether the plurality of edges of each multi-edge tool can be continuously used for machining, and selects one multi-edge tool with which the desired machining can be performed without the need for tool replacement and whose edges will not reach their end-of-life during the machining. In this way, the numerical control device 10 can minimize the number of times of tool replacement, and thus can control the cycle time.

Specifically, if the blocks of sequence numbers N1 to N20 are prefetched from the machining program 30 shown in FIG. 4, the tool selection unit 120 receives, from the tool type-edge type selection command decoding unit 111, the following as the internal information:

T[1]=0, P[1]="11";

T[2]=0, P[2]="12"; and

T[3]="200", P[3]="0". Based on the tool-edge data table 210 shown in FIG. 2 and the internal information indicating the edge types as P[1]="11" and P[2]="12", the tool selection unit 120 determines that selecting one of the multi-edge tools of tool numbers "1" to "4" each having the edges of edge type numbers "11" and "12" enables the desired machining to be performed continuously without the need for tool replacement. The tool selection unit 120 selects one tool in which the remaining life (the number of available times of use) of each edge will not become negative after the tool 1s used, i.e., after 1 is subtracted.

Here, referring to the machining program 30 shown in FIG. 4, edge type number "13" is not designated in the blocks of sequence numbers N1 to N20. Accordingly, to execute the blocks of sequence numbers N1 to N11 of the machining program 30, the tool selection unit 120 selects the multi-edge tool of tool number "3" in which the edge of edge type number "13" has reached its end-of-life. In this way, the numerical control device 10 can control the cycle time of the machining in which the multi-edge tool is used, even though one edge of the multi-edge tool has reached its end-of-life. Further, the numerical control device 10 can make full use of each edge of the multi-edge tool without wasting it, thereby enabling a reduction of the costs.

Further, the tool selection unit 120 selects the tool of tool number "6" in the block of sequence number N20 of the machining program 30, based on the internal information indicating tool type as T[3]="200". Then, the tool selection unit 120 transmits the results of selection to the tool replacement execution unit 130 and the tool compensation unit 140.

In this way, the tool selection unit 120 implements the smallest number of tool replacements, i.e., a single change from tool number "3" to tool number "6" during the execution of the blocks of sequence numbers N1 to N20 of the machining program 30, whereby the cycle time can be controlled.

Next, when the blocks of sequence numbers N30 to N60 of the machining program 30 are prefetched, the tool selection unit 120 receives, from the tool type-edge type selection command decoding unit 111, the following as internal information:

T[1]="100", P[1]="11";

T[2]="0", P[2]="12";

T[3]="0", P[3]="13"; and

T[4]="210", P[4]="0". Based on the tool-edge data table 210 and the internal information indicating the edge types as P[1]="11", P[2]="12", and P[3]="13", the tool selection unit 120 determines that selecting one of the multi-edge tools of tool numbers "1" to "4" each having the edges of edge type numbers "11" to "13" enables the desired machining to be performed continuously without the need for tool replacement. In this case, the tool selection unit 120 selects the multi-edge tool of tool number "2" the three edges of which each have the shortest remaining life (the smallest number of available times of use).

Further, the tool selection unit 120 selects the tool of tool number "7" in the block of sequence number N60 of the machining program 30, based on the internal information indicating the tool type as T[4]="210". Then, the tool selection unit 120 transmits the results of selection to the tool replacement execution unit 130 and the tool compensation unit 140.

In this way, the tool selection unit 120 implements tool replacement twice as the minimized number of times, i.e., a change from tool number "6" to tool number "2" and a change from tool number "2" to tool number "7" during the execution of the blocks of sequence numbers N30 to N60 of the machining program 30, whereby the cycle time can be controlled.

The tool replacement execution unit 130 calculates an axis movement amount necessary for replacement of a current tool with the tool selected by the tool selection unit 120.

The tool compensation unit 140 calculates a tool compensation amount by using a position offset amount (e.g., in the case of a lathe machining tool)/a tool length compensation amount (e.g., in the case of a milling tool) and an amount of tool nose radius compensation of the tool and edge selected by the tool selection unit 120.

The pulse distribution unit 150 outputs a pulse of each axis movement of the calculated tool replacement/tool compensation to each servo motor (not shown) included in the machine tool 20.

<NC Command Decoding Process of Numerical Control Unit 10>

Next, the operation related to an NC command decoding process of the numerical control device 10 according to the embodiment will be described.

Figure 5:
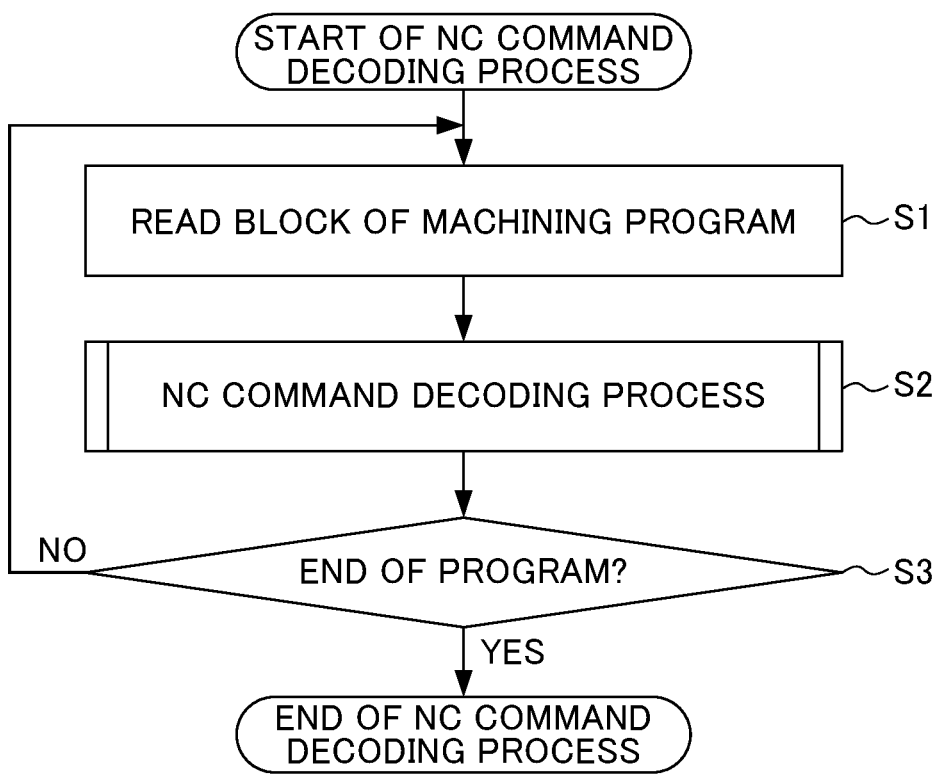
FIG. 5 is a flowchart illustrating a numerical control (NC) command decoding process performed by the numerical control device.

FIG. 5 is a flowchart illustrating the NC command decoding process performed by the numerical control device 10. By way of the shown flow, a tool replacement request or an edge change request based on a result of the decoding is provided for an NC command execution process to be described later. The shown flow is repeatedly carried out each time the numerical control device 10 acquires the machining program 30.

In Step S1, the NC command decoding unit 110 reads a block of the machining program 30.

In Step S2, the NC command decoding unit 110 performs the NC command decoding process on the machining program 30 read in Step S1. The detailed flow of the NC command decoding process will be described later.

In Step S3, the NC command decoding unit 110 determines whether the machining program 30 has been read up to the end of the program. If the reading up to the end of the program has been completed, the process ends. On the other hand, if the reading up to the end of the program has not yet been completed, the process returns to Step S1.

Figure 6:
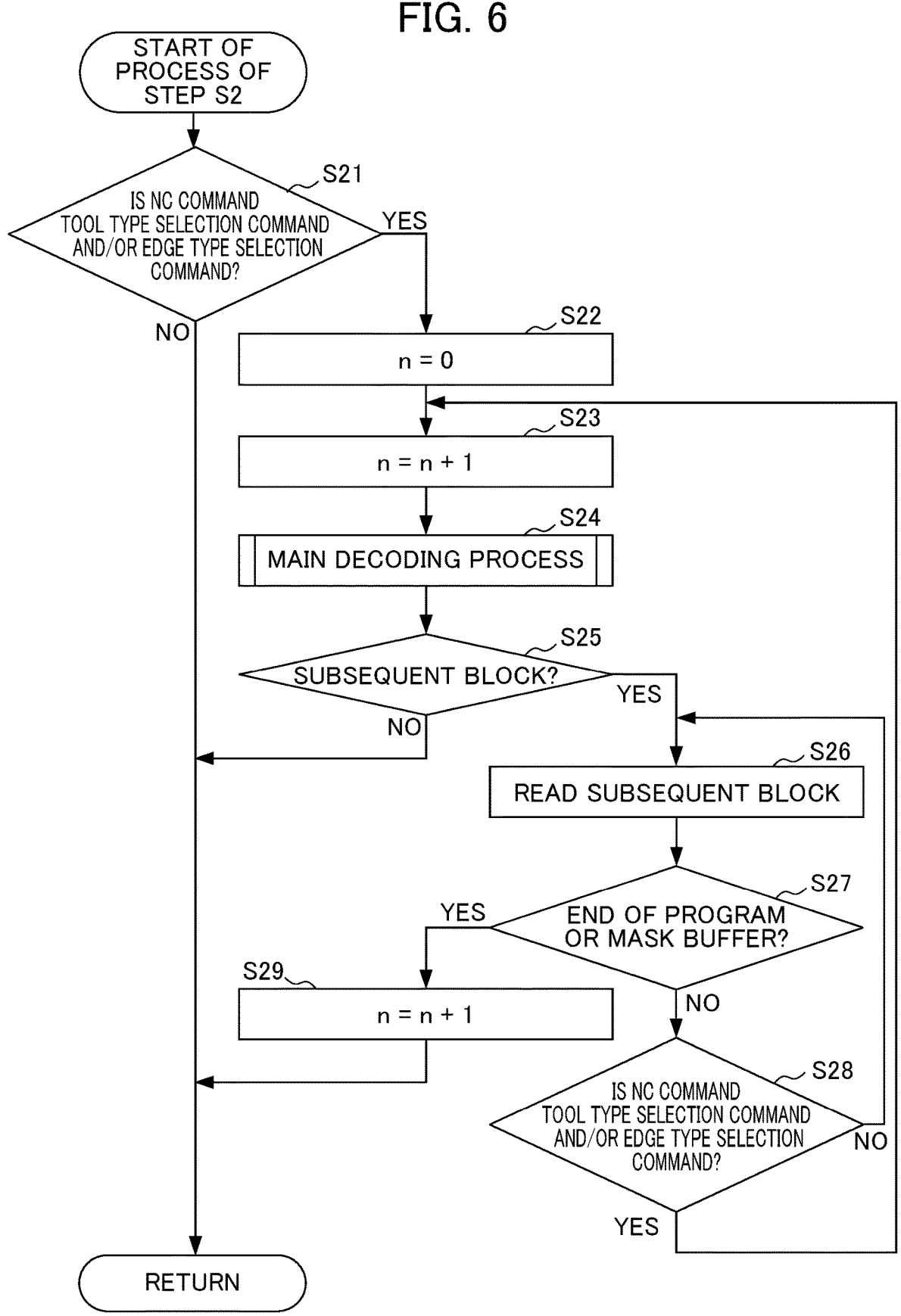
FIG. 6 is a flowchart illustrating the details of the NC command decoding process in Step S2 shown in FIG. 5.

FIG. 6 is a flowchart illustrating the details of the NC command decoding process in Step S2 shown in FIG. 5. In the flowchart of FIG. 6, if the NC command included in a read block is a tool type selection command and/or an edge type selection command, reading of the blocks of the machining program 30 is continued until information necessary for determining a tool to be selected is fully acquired. In the flowchart of FIG. 6, Steps S21 to S29 constitute a process flow performed by the tool type-edge type selection command decoding unit 111.

In Step S21, the tool type-edge type selection command decoding unit 111 determines whether the NC command included in the block read in Step S1 is a tool type selection command, an edge type selection command, or any other command. If the NC command is a tool type selection command and/or an edge type selection command, the process proceeds to Step S22. If the NC command is not a tool type selection command nor an edge type selection command, the flow of the NC command decoding process ends, and the process proceeds to Step S3.

In Step S22, the tool type-edge type selection command decoding unit 111 initializes a variable n that indicates the number of blocks including the tool type selection command and/or the edge type selection command.

In Step S23, the tool type-edge type selection command decoding unit 111 increases the variable n by 1.

In Step S24, the tool type-edge type selection command decoding unit 111 per a main decoding process. A detailed flow of the main decoding process will be described later.

In Step S25, the tool type-edge type selection command decoding unit 111 determines whether to read the subsequent block, based on the result of the main decoding process in Step S24. If it is determined that the subsequent block is to be read (i.e., to be prefetched), the process proceeds to Step S26. On the other hand, if it is determined that the subsequent block is not to be read, the flow of the NC command decoding process ends, and the process proceeds to Step S3 of FIG. 5.

In Step S26, the tool type-edge type selection command decoding unit 111 reads the subsequent block of the machining program 30.

In Step S27, the tool type-edge type selection command decoding unit 111 determines whether the block read in Step S26 is the end of the program, a mask buffer, or a block of any other type. If the block is the end of the program or a mask buffer, the process proceeds to Step S29. On the other hand, if the block is not the end of the program nor a mask buffer, the process proceeds to Step S28.

In Step S28, the tool type-edge type selection command decoding unit 111 determines whether the NC command included in the block read in Step S26 is a tool type selection command and/or an edge type selection command, or any other command. If the command is a tool type selection command and/or an edge type selection command, the process returns to Step S23. On the other hand, if the command is not a tool type selection command nor an edge type selection command, the process proceeds to Step S26.

In Step S29, the tool type-edge type selection command decoding unit 111 increases the variable n by 1 and outputs a tool replacement request to the tool selection unit 120. Then, the flow of the NC command decoding process ends, and the process proceeds to Step S3. An NC command execution process that is performed by the numerical control device 10 when the tool type-edge type selection command decoding unit 111 outputs the tool replacement request to the tool selection unit 120 will be described later.

Figure 7:
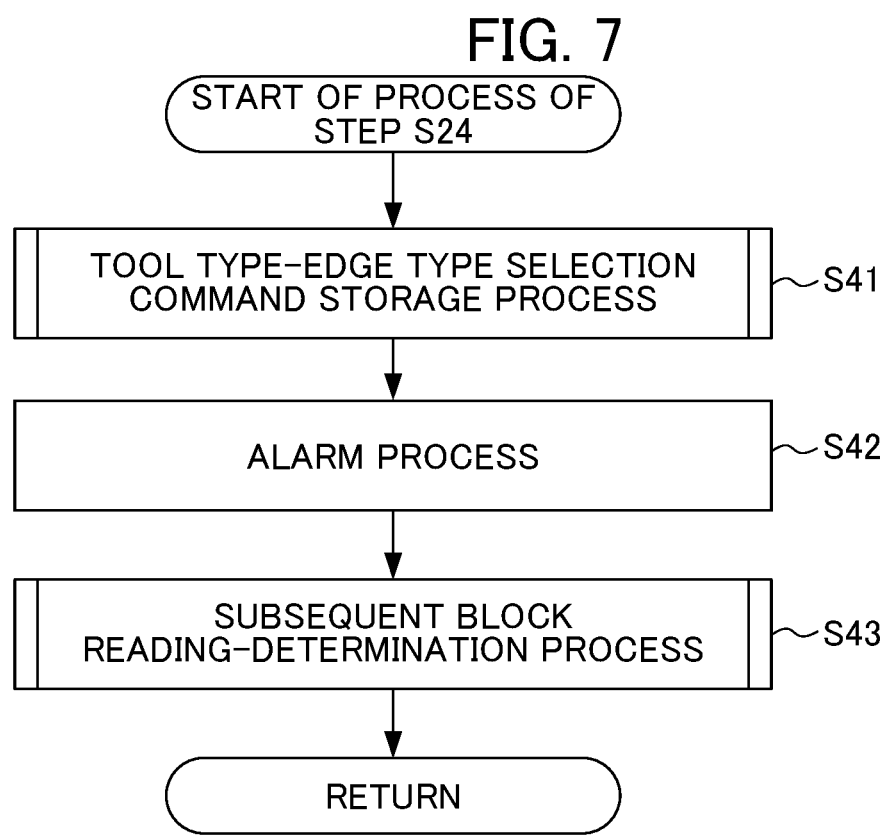
FIG. 7 is a flowchart illustrating the details of a main decoding process in Step S24 shown in FIG. 6.

FIG. 7 is a flowchart illustrating the details of the main decoding process in Step S24 shown in FIG. 6. In the flowchart of FIG. 7, Steps S41 to S43 constitute a process flow performed by the tool type-edge type selection command decoding unit 111.

In Step S41, the tool type-edge type selection command decoding unit 111 performs a tool type-edge type selection command storage process. The tool type-edge type selection command storage process will be described later.

In Step S42, the tool type-edge type selection command decoding unit 111 performs an alarm process. For example, the tool type-edge type selection command decoding unit 111 may issue an alarm and end the rearing of the blocks when no edge type selection command is provided even though a multi-edge tool has been selected according to a tool type selection command. Alternatively, the tool type-edge type selection command decoding unit 111 may issue an alarm and end the reading of the blocks when an edge type selection command is provided even though a tool other than a multi-edge tool is selected according to a tool type selection command.

When the tool type-edge type selection command decoding unit 111 issues an alarm, the numerical control device 10 may display the content of the alarm on a display device (not shown), such as a liquid crystal display, provided to the numerical control device 10. Such display allows a user of the numerical control device 10 to understand the content of the alarm and to address the alarm.

In Step S43, the tool type-edge type selection command decoding unit 111 performs a subsequent block reading-determination process. Then, the flow of the main decoding process ends, and the process proceeds to Step S25 shown in FIG. 6. The subsequent block reading-determination process will be described later.

Figure 8:
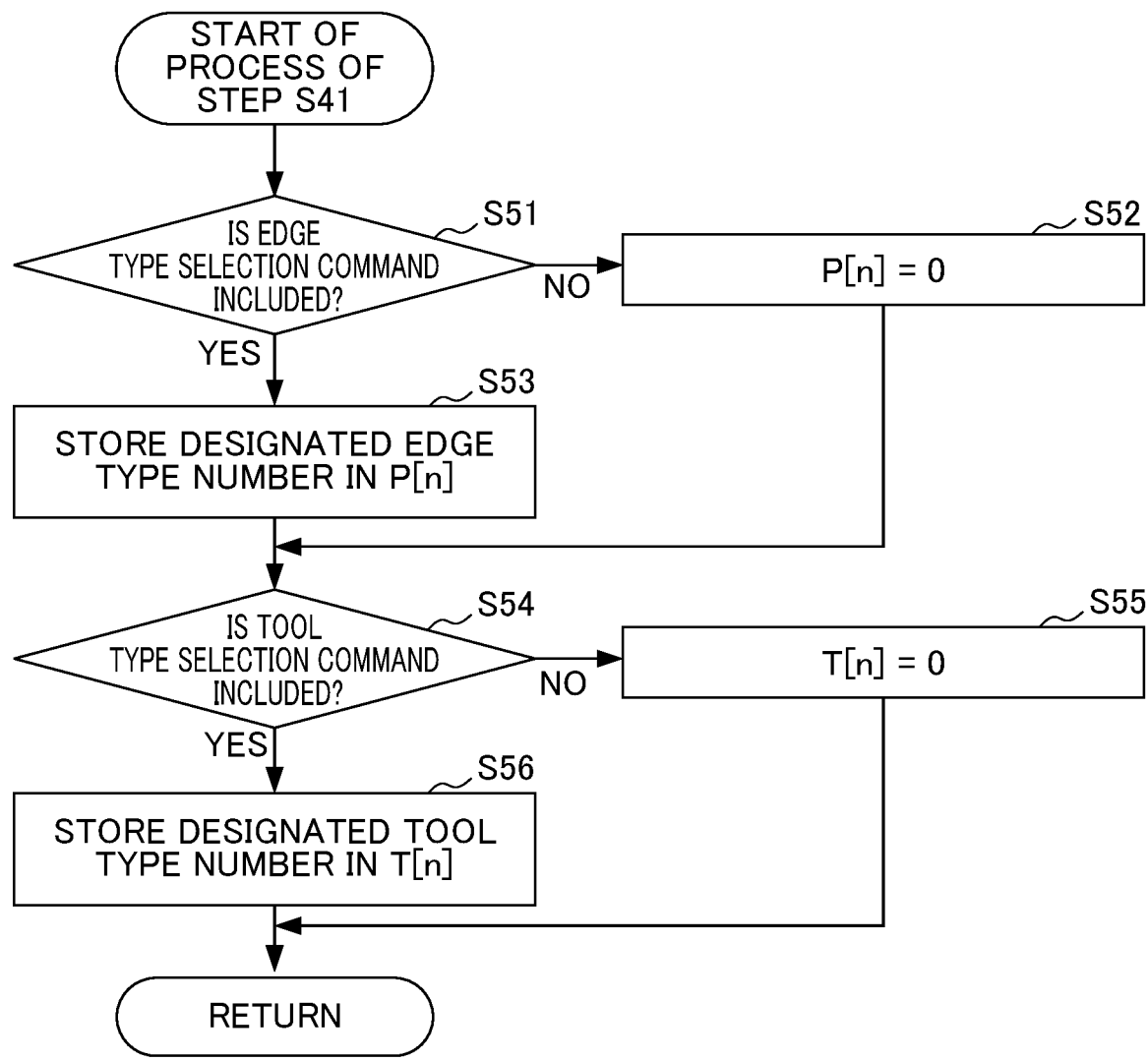
FIG. 8 is a flowchart illustrating the details of a tool type-edge type selection command storage process in Step S41 shown in FIG. 7.

FIG. 8 is a flowchart illustrating the details of the tool type-edge type selection command storage process in Step S41 shown in FIG. 7. In the flowchart of FIG. 8, Steps S51 to S56 constitute a process flow performed by the tool type-edge type selection command decoding unit 111.

In Step S51, the tool type-edge type selection command decoding unit 111 determines whether the nth read block includes an edge type selection command. If no edge type selection command is included, the process proceeds to Step S52. On the other hand, if an edge type selection command is included, the process proceeds to Step S53.

In Step S52, the tool type-edge type selection command decoding unit 111 stores "0" in the nth edge type P[n].

In Step S53, the tool type-edge type selection command decoding unit 111 stores the edge number designated by the edge type selection command of the nth read block, in the edge type P[n].

In Step S54, the tool type-edge type selection command decoding unit 111 determines whether the nth read block includes a tool type selection command. If no tool type selection command is included, the process proceeds to Step S55. On the other hand, if a tool type selection command is included, the process proceeds to Step S56.

In Step S55, the tool type-edge type selection command decoding unit 111 stores "0" in the nth tool type T[n]. Then, the flow of the tool type-edge type selection command storage process ends, and the process proceeds to Step S42 in FIG. 7.

In Step S56, the tool type-edge type selection command decoding unit 111 stores the tool type number designated by the tool type selection command of the nth read block, in the tool type T[n]. Then, the flow of the tool type-edge type selection command storage process ends, and the process proceeds to Step S42 in FIG. 7.

Figure 9:
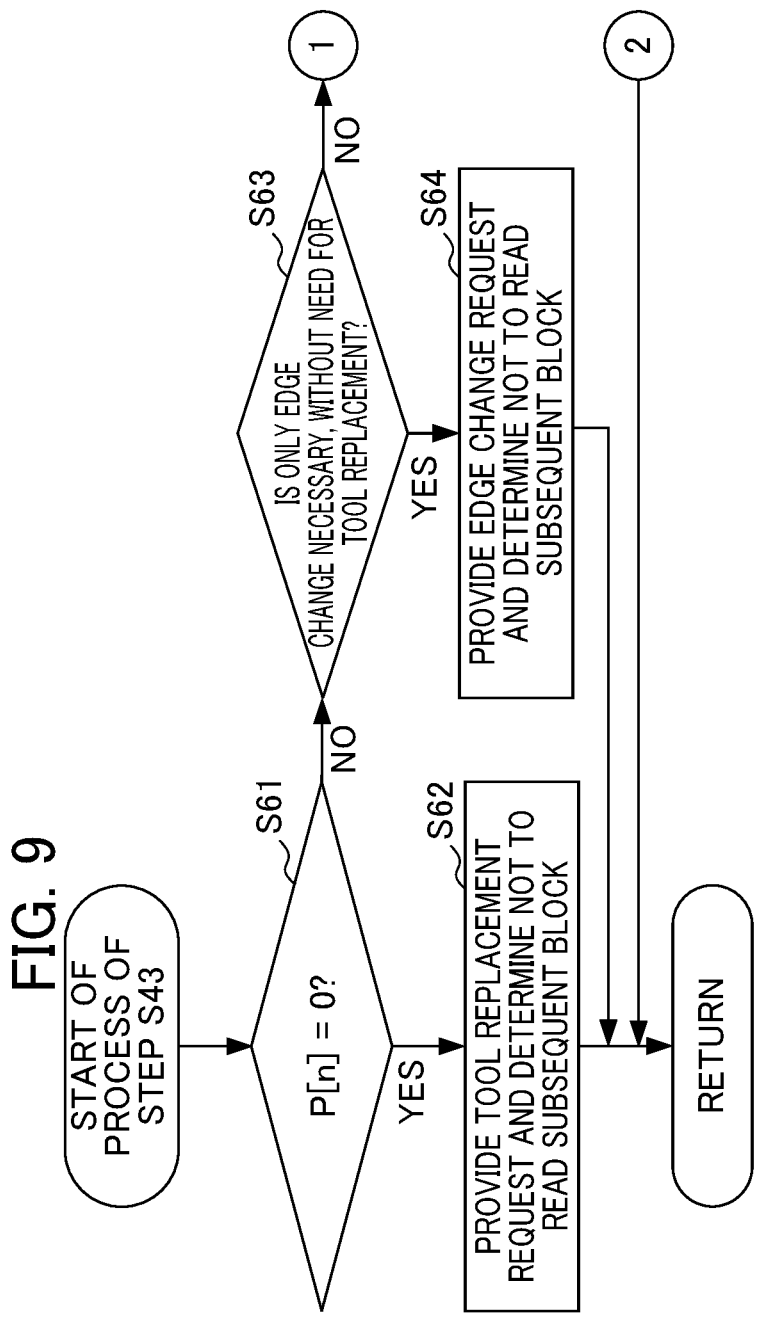
FIG. 9 is a flowchart illustrating the details of a subsequent block reading-determination process in Step S43 shown in FIG. 7.
Figure 10:
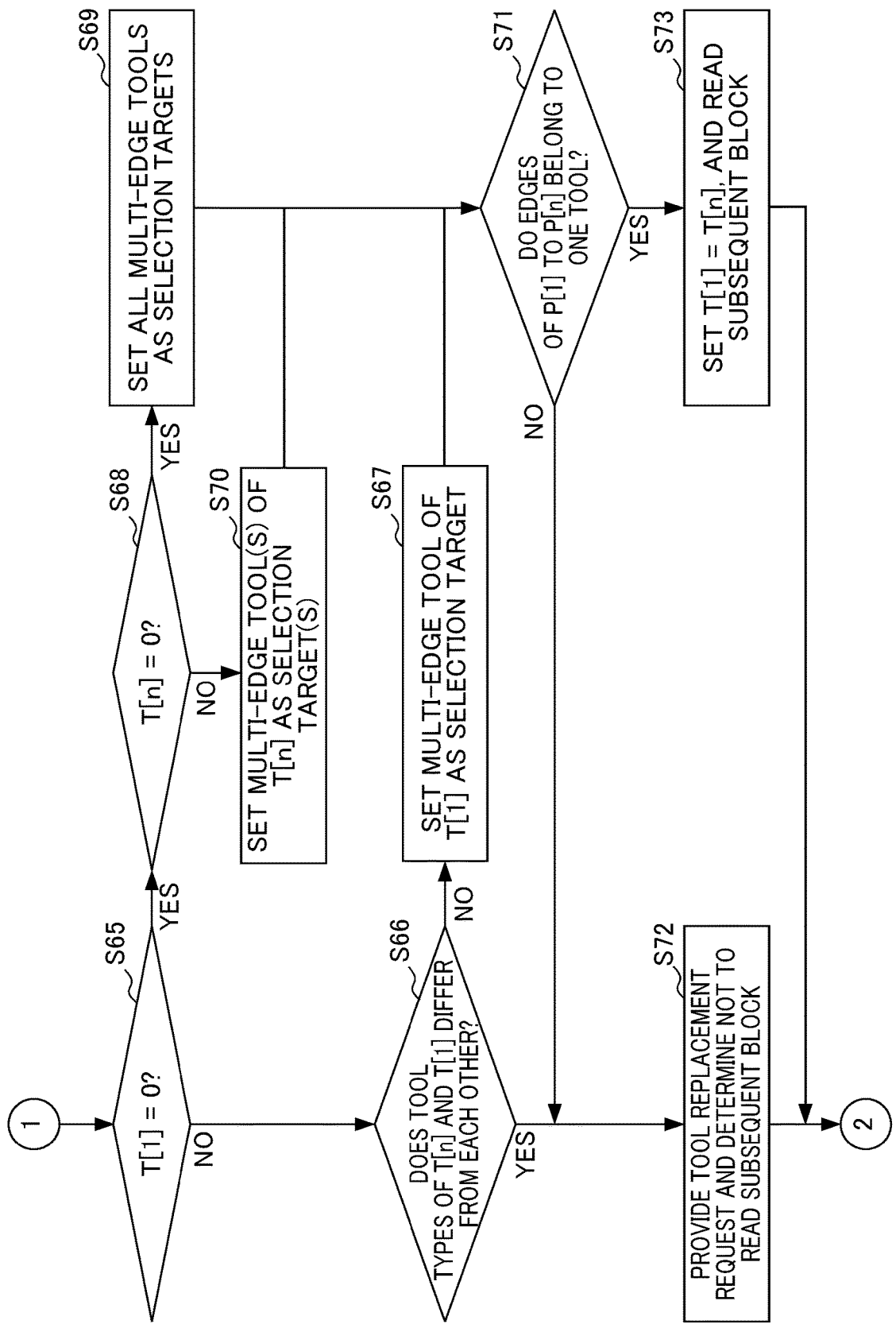
FIG. 10 is a flowchart illustrating the continuation of the subsequent block reading-determination process of FIG. 9.

FIGS. 9 and 10 are flowcharts illustrating the details of the subsequent block reading-determination process in Step S43 shown in FIG. 7. In the flowcharts of FIGS. 9 and 10, Steps S61 to S73 constitute a process flow performed by the tool type-edge type selection command decoding unit 111.

In Step S61, the tool type-edge type selection command decoding unit 111 determines whether the nth edge type P[n] is "0". If the edge type P[n] is "0", the process proceeds to Step S62. On the other hand, if the edge type P[n] is not "0", the process proceeds to Step S63.

In Step S62, the tool type-edge type selection command decoding unit 111 provides a tool replacement request to the tool selection unit 120 and determines not to read the subsequent block. Then, the tool type-edge type selection command decoding unit 111 ends the flow of the subsequent block reading-determination process, and the process proceeds to Step S25 shown in FIG. 6.

For example, as described earlier, in the block of sequence number N1 of the machining program 30 shown in FIG. 4, the blocks up to sequence number N20 are prefetched, and consequently, it is determined that P[3]="0". Accordingly, the tool type-edge type selection command decoding unit 111 provides a tool replacement request to the tool selection unit 120. The tool type-edge type selection command decoding unit 111 then determines not to read any block subsequent to the block of sequence number N30. Thus, in Step S25 of FIG. 6, the tool type-edge type selection command decoding unit 111 determines not to read the subsequent block. Then, the flow of the NC command decoding process shown in FIG. 6 ends, and the process proceeds to Step S3 shown in FIG. 5. In other words, the numerical control device 10 starts the NC command decoding process on the block of sequence number N2 and the subsequent blocks of the machining program 30 shown in FIG. 4.

In the block of sequence number N30 of the machining program 30 shown in FIG. 4, the blocks up to sequence number N60 are prefetched, and consequently, it is determined that P[4]="0". Accordingly, the tool type-edge type selection command decoding unit 111 determines not to read the subsequent block. Thus, in Step S25 of FIG. 6, the tool type-edge type selection command decoding unit 111 determines not to read the subsequent block. Then, the flow of the NC command decoding process shown in FIG. 6 ends, and the process proceeds to Step S3 shown in FIG. 5.

In Step S63, the tool type-edge type selection command decoding unit 111 determines whether tool replacement is unnecessary, while determining that only the edge of edge type P[n] needs to be changed. If the tool replacement is unnecessary, the process proceeds to Step S64. On the other hand, if tool replacement is necessary, the process proceeds to Step S65 shown in FIG. 10.

In Step S64, the tool type-edge type selection command decoding unit 111 provides an edge change request to the tool selection unit 120 and determines not to read the subsequent block. Then, the tool type-edge type selection command decoding unit 111 ends the flow of the subsequent block reading-determination process, and the process proceeds to Step S25 shown in FIG. 6.

For example, in the block of sequence number N10 of the machining program 30 shown in FIG. 4, the tool type-edge type selection command decoding unit 111 generates internal information indicating that the edge type P[1]="12". In this case, the block of sequence number N10 has no tool type selection command "other than the currently used tool", and the tool of tool number "3" selected in the block of sequence number N1 has the designated edge of edge type P[1] whose life will not expire. Therefore, based on the internal information indicating that edge type P[1]="12", the tool type-edge type selection command decoding unit 111 provides an edge change request to the tool selection unit 120, requesting that the current edge be changed to the edge of edge number "2" of the tool of tool number "3".

In Step S65 shown in FIG. 10, the tool type-edge type selection command decoding unit 111 determines whether the tool type number of the first tool type T[1] is "0". If the tool type number of the tool type T[1] is "0", the process proceeds to Step S68. On the other hand, if the tool type number of the tool type T[1] is not "0", the process proceeds to Step S66.

In Step S66, the tool type-edge type selection command decoding unit 111 determines whether the tool type designated by the tool type T[n] differs from the tool type designated by the tool type T[1]. If the tool types respectively designated by the tool type T[n] and the tool type T[1] are different from each other, the process proceeds to Step S72. On the other hand, if the tool types respectively designated by the tool type T[n] and the tool type T[1] are the same as each other, the process proceeds to Step S67.

In Step S67, the tool type-edge type selection command decoding unit 111 sets the multi-edge tool indicated by the tool type number of the tool type T[1] as the selection target.

In Step S68, the tool type-edge type selection command decoding unit 111 determines whether the tool type number of the nth tool type T[n] is "0" (i.e., whether no tool type selection command is included). If the tool type number of the tool type T[n] is "0", the process proceeds to Step S69. On the other hand, if the tool type number of the tool type T[n] is not "0", the process proceeds to Step S70.

In Step S69, since no tool type selection command is included, the tool type-edge type selection command decoding unit 111 sets all the multi-edge tools as selection targets.

In Step S70, the tool type-edge type selection command decoding unit 111 sets the multi-edge tool(s) indicated by the tool type number of the tool type T[n] as the selection target(s).

In Step S71, the tool type-edge type selection command decoding unit 111 determines whether the edge types P[1] to P[n] belong to one tool as the selection target set in Step S67, S69, or S70. If the edge types P[1] to P[n] belong to one tool, the process proceeds to Step S73. On the other hand, if the edge types P[1] to P[n] do not belong to one tool, the process proceeds to Step S72.

In Step S72, the tool type-edge type selection command decoding unit 111 provides a tool replacement request to the tool selection unit 120 and determines not to read the subsequent block. Then, the flow of the subsequent block reading-determination process ends, and the process proceeds to Step S25 shown in FIG. 6.

In Step S73, the tool type-edge type selection command decoding unit 111 sets T[1]=T[n], and determines to read the subsequent block. Then, the flow of the subsequent block reading-determination process ends, and the process proceeds to Step S25 shown in FIG. 6.

For example, an assumption is made that the internal information indicates as follows:

T[1]="0", P[1]="11";
T[2]="0", P[2]="12";
T[3]="0", P[3]="13";
T[4]="100", P[4]"11";
T[5]="0", P[5]="12"; and
T[6]="101", P[6]="11". In this case, when reading the tool type T[4], the tool type-edge type selection command decoding unit 111 determines that the edge types P[1] to P[4] belong to one tool in Step S71, and the process proceeds to Step S73. In Step S73, a determination is made that T[1]=T[4], and consequently, it is set that T[1]="100".

On the other hand, when reading the tool type T[6], the tool type-edge type selection command decoding unit 111 determines that the tool types T[1] and T[6] are different from each other in Step S66, and the process proceeds to Step S72.

<NC Command Execution Process of Numerical Control Unit 10>

Next, an operation related to an NC command execution process of the numerical control device 10 according to the embodiment will be described.

Figure 11:
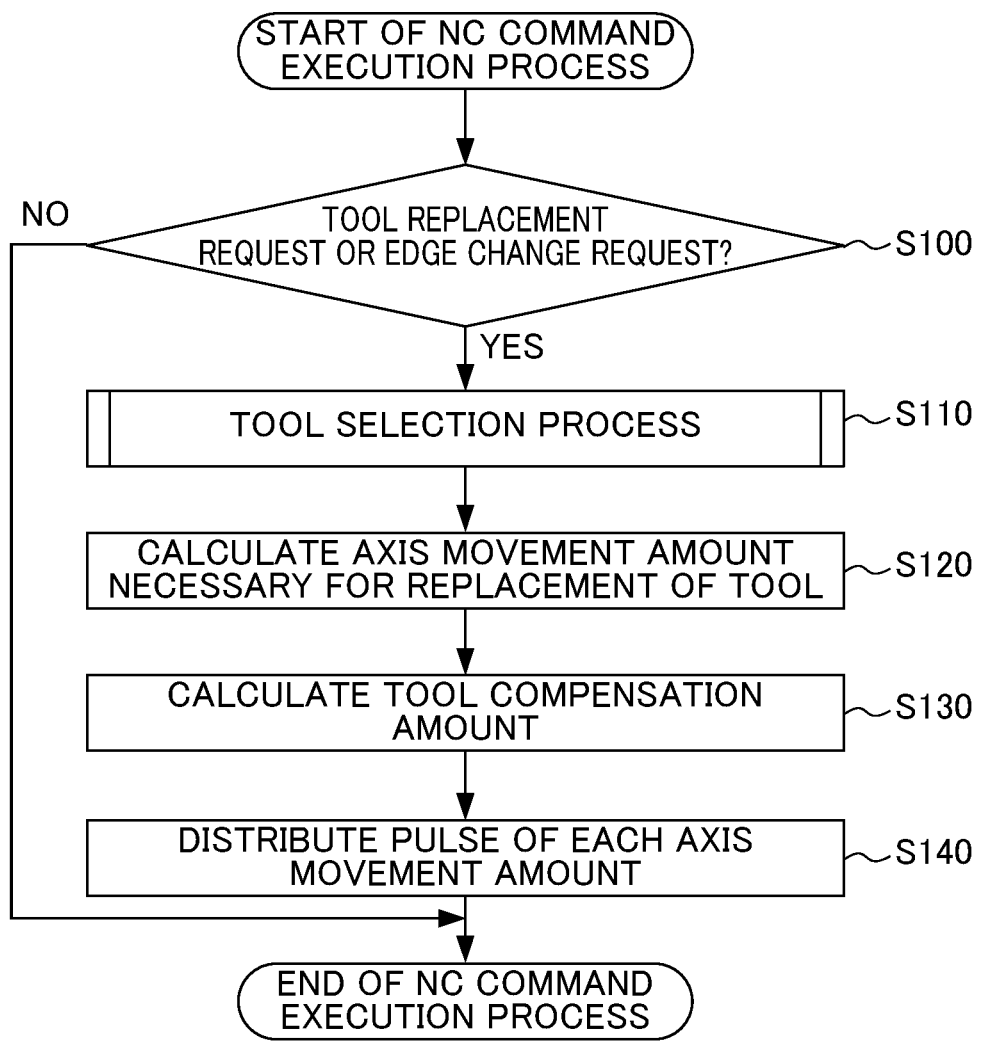
FIG. 11 is a flowchart illustrating an NC command execution process performed by the numerical control device.

FIG. 11 is a flowchart illustrating the NC command execution process performed by the numerical control device 10. The shown flow is carried out repeatedly each time a tool replacement request or an edge change request is provided by way of the NC command decoding process shown in FIG. 5.

In Step S100, the tool selection unit 120 determines whether a tool replacement request or an edge change request has been received from the tool type-edge type selection command decoding unit 111. If a tool replacement request or an edge change request has been received, the process proceeds to Step S110. On the other hand, if a tool replacement request or an edge change request has not been received, the flow of the NC command execution process ends.

In Step S110, the tool selection unit 120 performs a tool selection process. The tool selection process will be described later.

In Step S120, the tool replacement execution unit 130 calculates an axis movement amount necessary for replacement of a current tool with the tool selected by the tool selection unit 120 in Step S110.

In Step S130, the tool compensation unit 140 calculates a tool compensation amount by using the position offset amount (e.g., in the case of a lathe machining tool)/the tool length compensation amount (e.g., in the case of a milling tool), and an amount of tool nose radius compensation of the tool and edge selected in Step S110.

In Step S140, the pulse distribution unit 150 outputs a pulse of each axis movement of the tool replacement/tool compensation calculated in Steps S120 and S130 to each servo motor (not shown) included in the machine tool 20.

Figure 12:
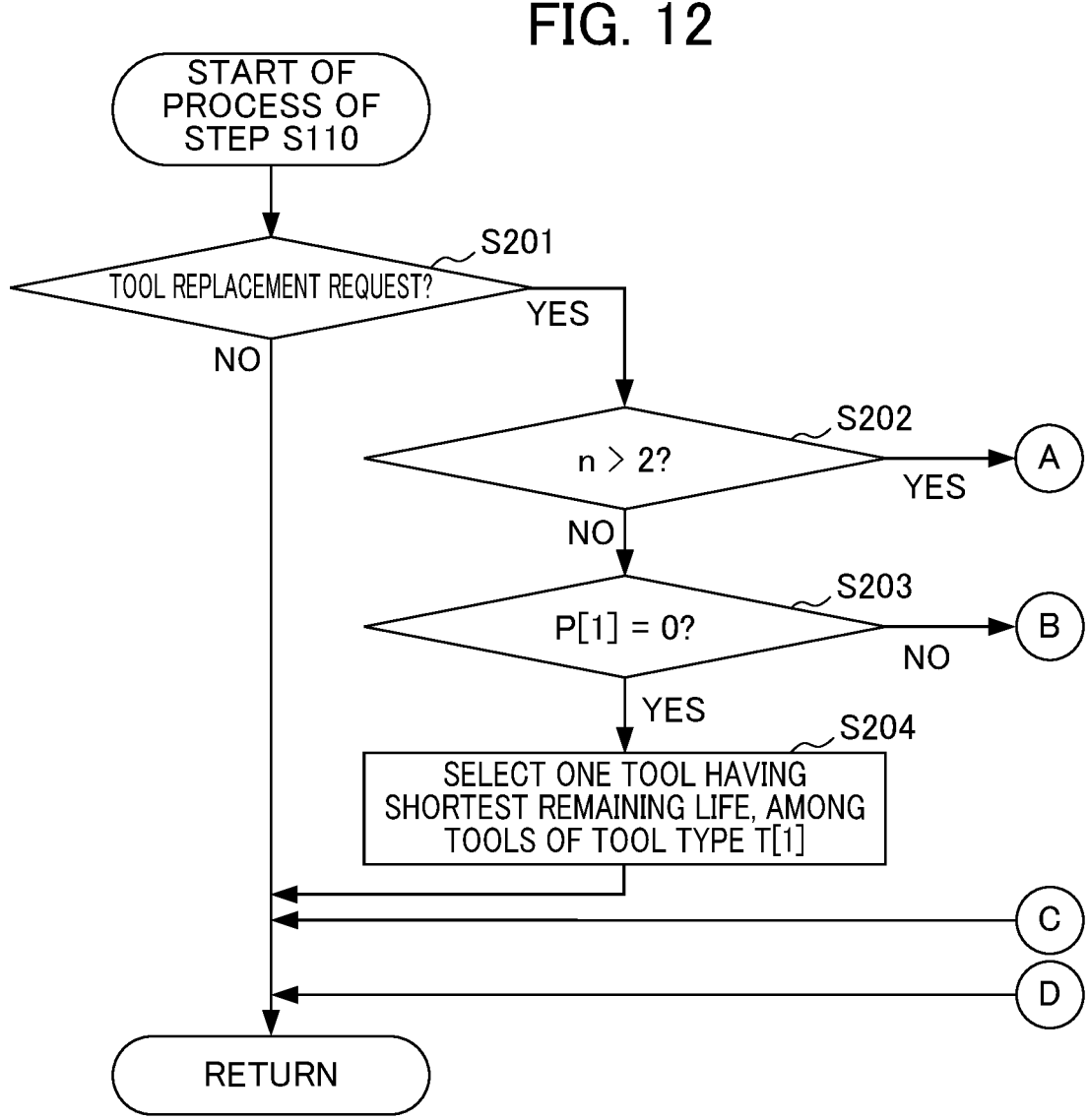
FIG. 12 is a flowchart illustrating the details of a tool selection process in Step S110 shown in FIG. 11.
Figure 13:
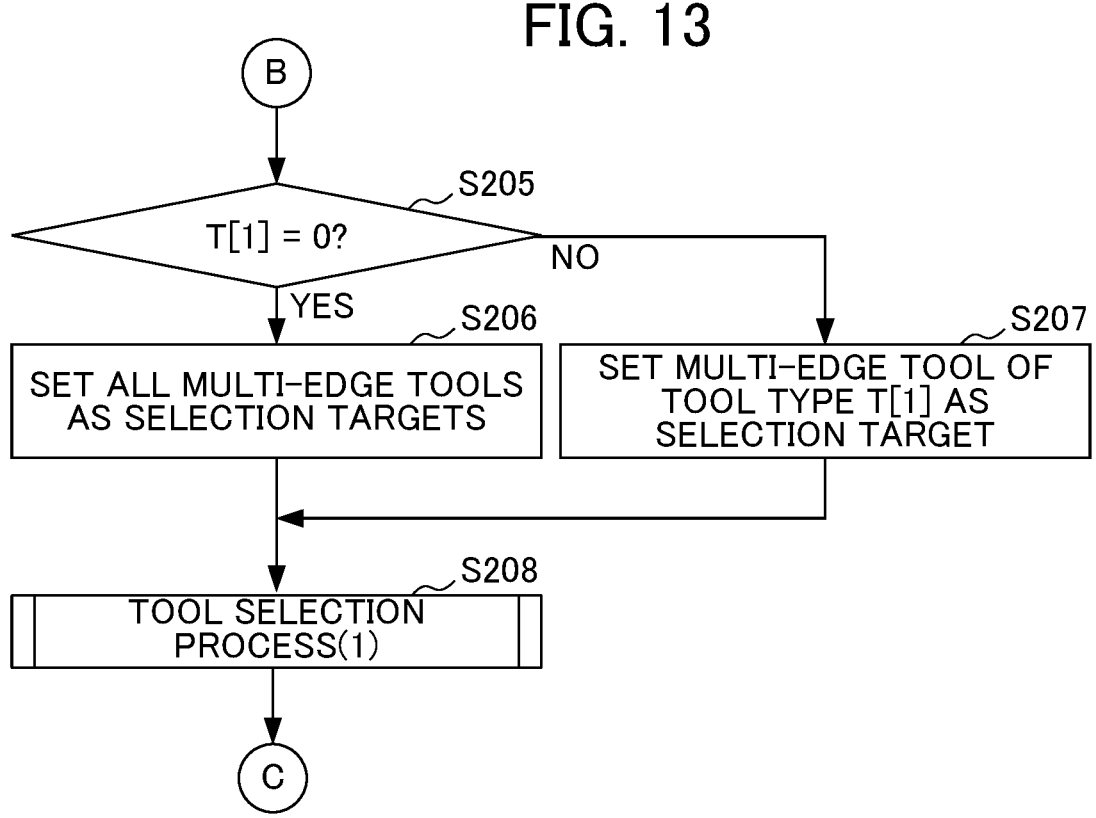
FIG. 13 is a flowchart illustrating the continuation of the tool selection process shown in FIG. 12.
Figure 14:
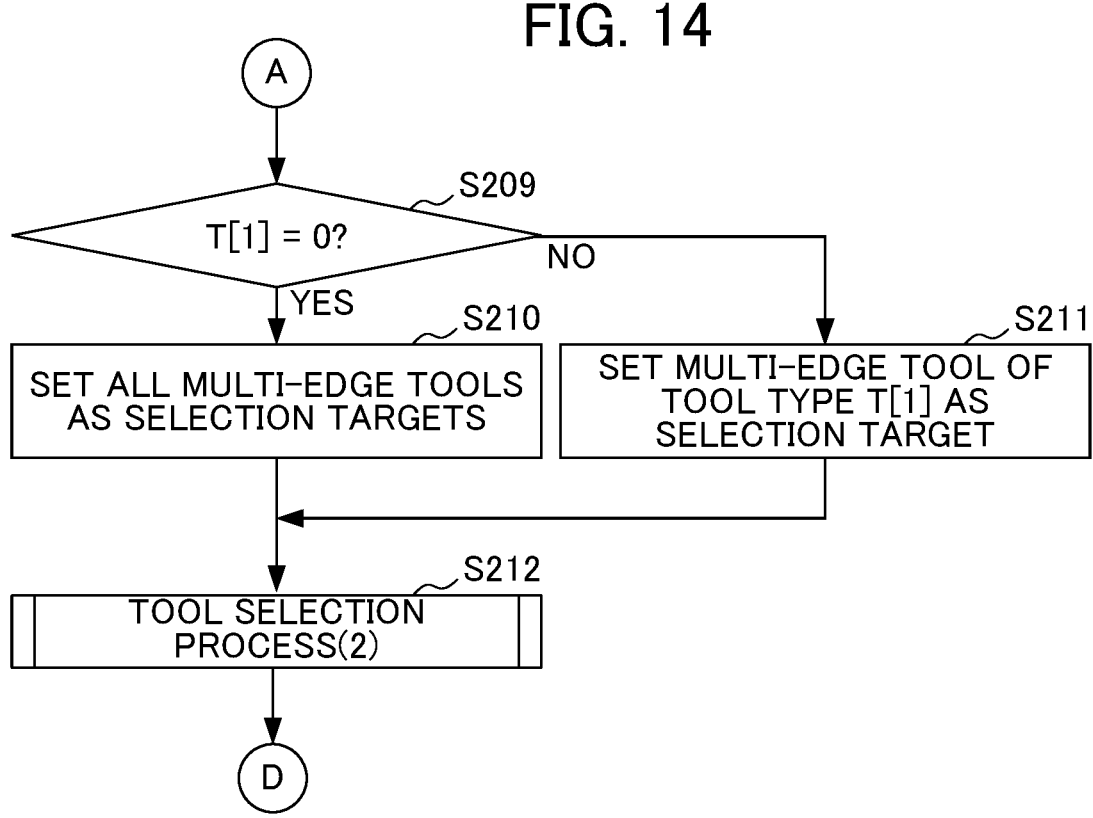
FIG. 14 is a flowchart illustrating the continuation of the tool selection process shown in FIG. 12.

FIGS. 12 to 14 are flowcharts illustrating the details of the tool selection process in Step S110 shown in FIG. 11. In the flowchart of FIGS. 12 to 14, Steps S201 to S212 constitute a process flow performed by the tool selection unit 120.

In Step 201, the tool selection unit 120 determines whether the request received in Step S110 is a tool replacement request. If the request is a tool replacement request, the process proceeds to Step S202. On the other hand, if the request is not a tool replacement request, but an edge change request, the tool selection unit 120 determines to continue using the currently selected tool, and the process proceeds to Step S120 such that edge change is implemented.

In Step S202, the tool selection unit 120 determines whether the variable n is greater than 2 in order to determine whether three or more tool selection commands and edge selection commands have been decoded. If the variable n is greater than 2, the process proceeds to Step S209 shown in FIG. 14. On the other hand, if the variable n is 2 or less, the process proceeds to Step S203.

In Step S203, the tool selection unit 120 determines whether the edge type P[1] is "0". If the edge type P[1] is "0", the process proceeds to Step S204. On the other hand, if the edge type P[1] is not "0", the process proceeds to Step S205 shown in FIG. 13.

In Step S204, the tool selection unit 120 selects one tool having the shortest remaining life among the tools of the edge type T[1]. Then, the flow of the tool selection process of Step S110 ends, and the process proceeds to Step S120 shown in FIG. 11.

Note that "have/has/having the shortest remaining life" excludes the case where the end-of-life has been reached, i.e., the remaining life "0".

In Step S205 shown in FIG. 13, the tool selection unit 120 determines whether the tool type T[1] is "0" (i.e., whether no tool selection command is provided). If the tool type T[1] is "0" (i.e., if no tool selection command is provided), the process proceeds to Step S206. On the other hand, if the tool type T[1] is not "0" (i.e., a tool selection command is provided), the process proceeds to Step S207.

In Step S206, the tool selection unit 120 sets all the multi-edge tools as selection targets.

In Step S207, the tool selection unit 120 sets the multi-edge tool of the tool type T[1] as a selection target.

In Step S208, the tool selection unit 120 performs a tool selection process (1). The tool selection process (1) will be described later.

In Step S209 shown in FIG. 14, the tool selection unit 120 determines whether the tool type T[1] is "0" (i.e., whether no tool selection command is provided). If the tool type T[1] is "0" (i.e., if no tool selection command is provided), the process proceeds to Step S210. On the other hand, if the tool type T[1] is not "0" (i.e., if a tool selection command is provided), the process proceeds to Step S211.

In Step S210, the tool selection unit 120 sets all the multi-edge tools as selection targets.

In Step S211, the tool selection unit 120 sets the multi-edge tool of the tool type T[1] as a selection target.

In Step S212, the tool selection unit 120 performs a tool selection process (2). The tool selection process (2) will be described later.

Figure 15:
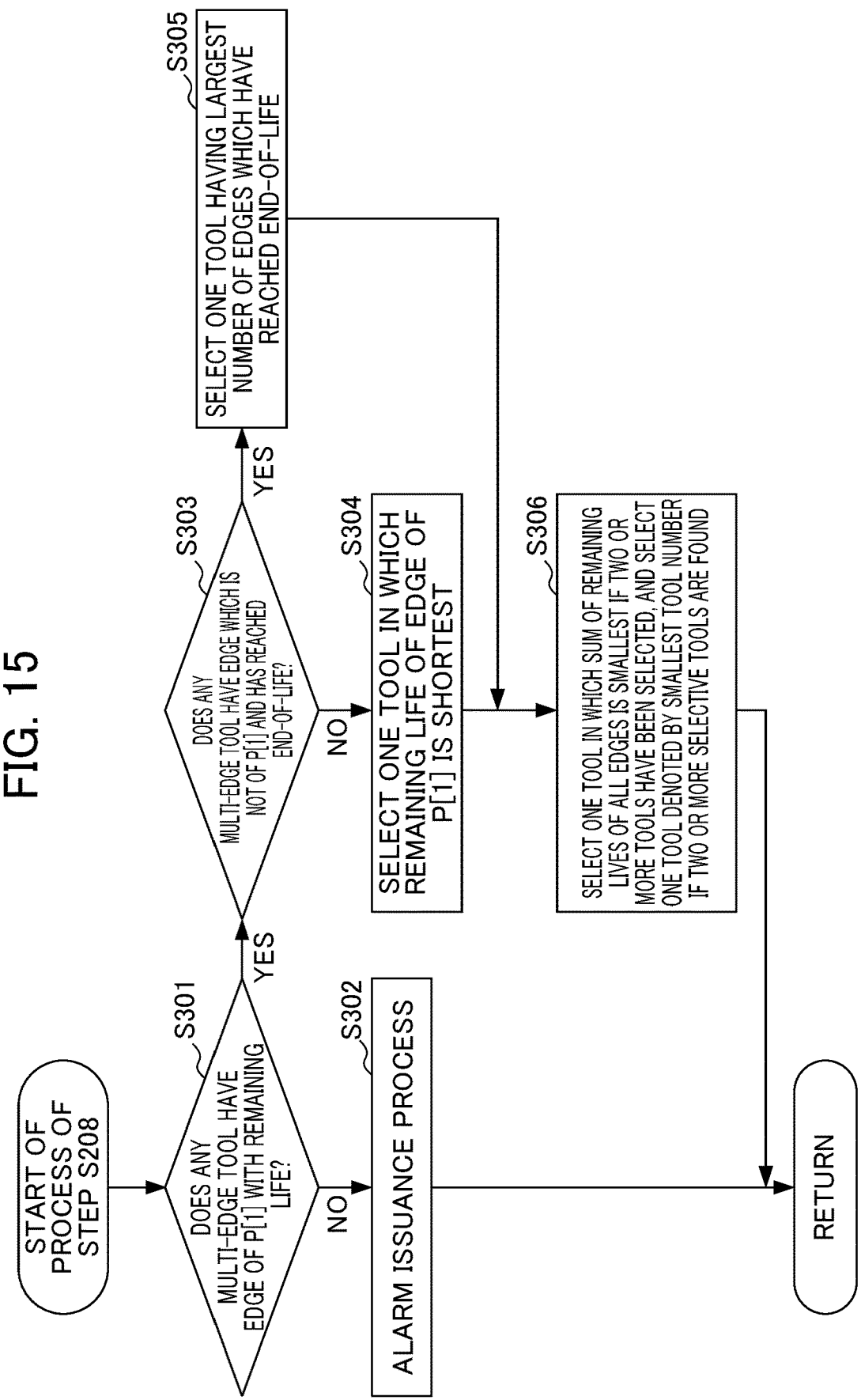
FIG. 15 is a flowchart illustrating the details of a tool selection process (1) in Step S208 shown in FIG. 13.

FIG. 15 is a flowchart illustrating the details of the tool selection process (1) in Step S208 shown in FIG. 13. In the flowchart of FIG. 15, Steps S301 to S306 constitute a process flow performed by the tool selection unit 120.

In Step S301, the tool selection unit 120 determines whether any multi-edge tool has an edge of the edge type P[1] with a remaining life. If any multi-edge tool has an edge of the edge type P[1] with a remaining life, the process proceeds to Step S303. On the other hand, if no multi-edge tool has an edge of the edge type P[1] with a remaining life, the process proceeds to Step S302.

In Step S302, the tool selection unit 120 performs an alarm issuance process to inform the user of the numerical control device 10 that no multi-edge tool has an edge of the edge type P[1] with a remaining life. The flow of the tool selection process (1) of Step S208 ends, and the process proceeds to Step S120 shown in FIG. 11.

In this case, for example, the tool selection unit 120 may cause the display device (not shown) of the numerical control device 10 to display an alarm indicating that no multi-edge tool has an edge of the edge type P[1] with a remaining life. In response to such display of the alarm, the user of the numerical control device 10 can replace the current tool with a new multi-edge tool having an edge of the edge type P[1].

In Step S303, the tool selection unit 120 determines whether any multi-edge tool has an edge which is not of the edge type P[1] and has reached the end-of-life. If any multi-edge tool has an edge which is not of the edge type P[1] and has reached the end-of-life, the process proceeds to Step S305. On the other hand, if no multi-edge tool has an edge which is not of the edge type P[1] and has reached the end-of-life, the process proceeds to Step S304.

In Step S304, the tool selection unit 120 selects one tool in which the remaining life of the edge of the edge type P[1] is the shortest.

In Step S305, the tool selection unit 120 selects one tool having the largest number of edges that have reached their end-of-life.

If two or more tools have the same largest number of edges that have reached their end-of-life, the tool selection unit 120 may select one tool in which the remaining life of the edge of the edge type P[1] is the shortest.

In Step S306, the tool selection unit 120 selects one tool in which the sum of the remaining lives of all the edges is the smallest, if two or more tools have been selected in Step S304 or S305. In a case where two or more selective tools are found in Step S306, the tool selection unit 120 selects one tool denoted by the smallest tool number. Then, the flow of the tool selection process (1) of Step S208 ends, and the process proceeds to Step S120 shown in FIG. 11.

Figure 16:
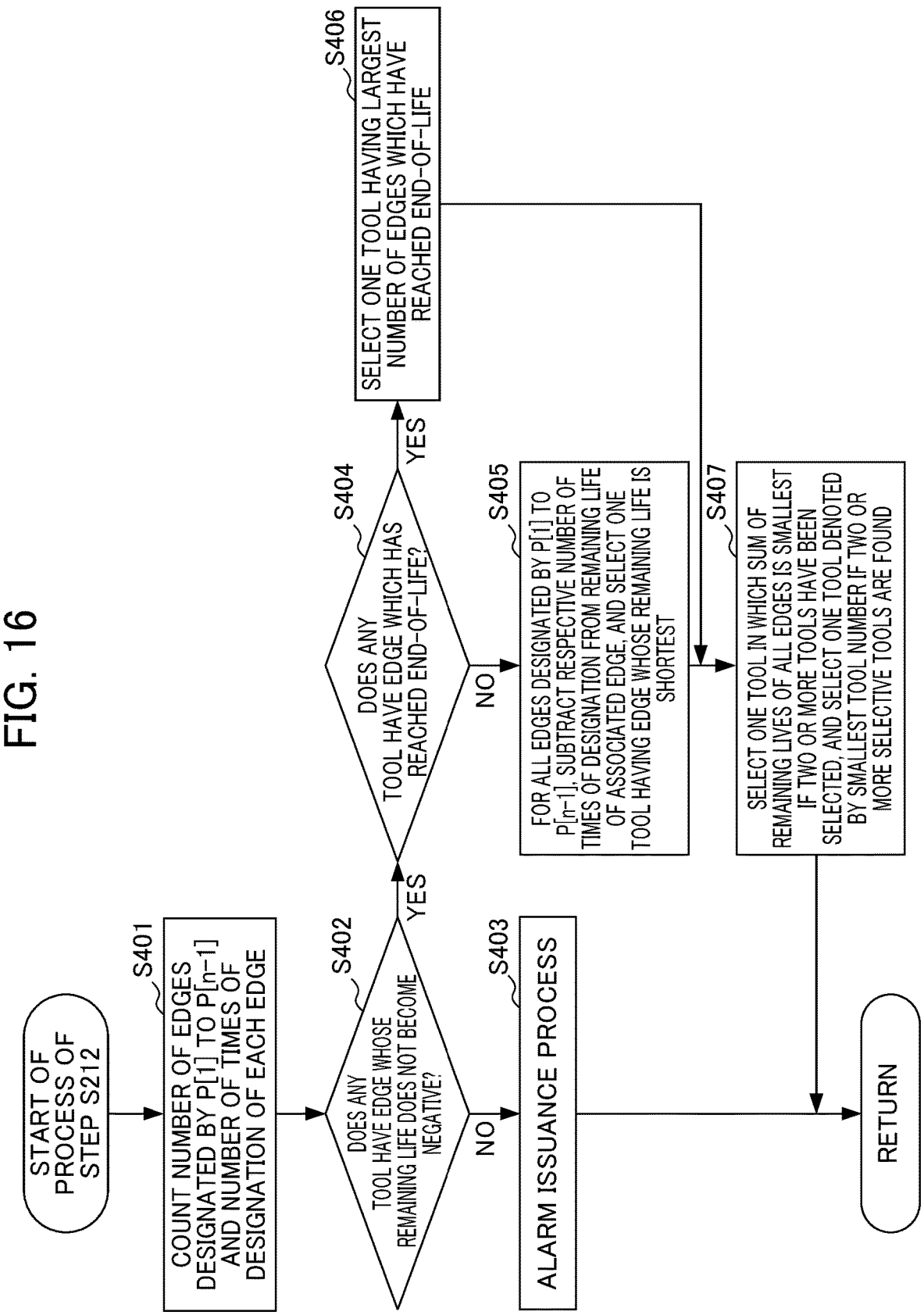
FIG. 16 is a flowchart illustrating the details of a tool selection process (2) in Step S212 shown in FIG. 14.

FIG. 16 is a flowchart illustrating the details of the tool selection process (2) in Step S212 shown in FIG. 14. In the flowchart of FIG. 16, Steps S401 to S407 constitute a process flow performed by the tool selection unit 120.

In Step S401, the tool selection unit 120 counts the number of edges designated by the edge types P[1] to P[n−1] and the number of times of designation of each edge.

In Step S402, in respect of all the edges designated by the edge types P[1] to P[n−1], the tool selection unit 120 subtracts the respective number of times of designation counted in Step S401 from the remaining life of the associated edge, so as to determine whether any tool has a designated edge whose remaining life does not become negative. If any tool has a designated edge whose remaining life does not become negative, the process proceeds to Step S404. On the other hand, if no tool has a designated edge whose remaining life does not become negative, i.e., if the remaining lives of the edges of the designated edge types become negative in all the tools, the process proceeds to Step S403.

In Step S403, the tool selection unit 120 performs an alarm issuance process to inform the user of the numerical control device 10 that the remaining lives of the edges of the designated edge types become negative in all the tools. Then, the flow of the tool selection process (2) of Step S212 ends, and the process proceeds to Step S120 shown in FIG. 11.

In this case, for example, the tool selection unit 120 may cause the display device (not shown) of the numerical control device 10 to display an alarm indicating that the edges of the designated edge types become negative in all the tools. In response to such display of the alarm, the user of the numerical control device 10 can replace a currently used tool with a new multi-edge tool having the edges of the designated edge types.

In Step S404, the tool selection unit 120 determines whether any multi-edge tool has an edge which is not of the edge types P[1] to P[n−1] and has reached the end-of-life. If any multi-edge tool has an edge which has reached the end-of-life, the process proceeds to Step S406. On the other hand, if no multi-edge tool has an edge which has reached the end-of-life, the process proceeds to Step S405.

In Step S405, the tool selection unit 120 subtracts the respective number of times of designation from the remaining life of the edge designated by the associated one of the edge types P[1] to P [n−1], and selects one tool having an edge whose remaining life is the shortest.

In Step S406, the tool selection unit 120 selects one tool having the largest number of edges that have reached their end-of-life.

If two or more tools have the same largest number of edges, the tool selection unit 120 may subtract the number of times of designation from the remaining lives of the edges designated by the edge types P[1] to P[n−1], and may select one tool having an edge whose remaining life is the shortest.

In Step S407, the tool selection unit 120 selects one tool in which the sum of the remaining lives of all the edges is the smallest, if two or more tools have been selected in Step S405 or S406. In a case where two or more selective tools are found in Step S407, the tool selection unit 120 selects one tool denoted by the smallest tool number. Then, the flow of the tool selection process (2) of Step S212 ends, and the process proceeds to Step S120 shown in FIG. 11.

By way of the processes described above, the numerical control device 10 of the present embodiment prefetches the plurality of blocks included in the machining program 30, and decodes the tool type selection command for selecting a tool type in the plurality of prefetched blocks and/or the edge type selection command for selecting an edge type in the plurality of prefetched blocks. The numerical control device 10 generates internal information including the prefetched tool type selection command and/or the prefetched edge type selection command. The numerical control device 10 selects one tool with which the number of times of tool replacement is minimized during the execution of at least the plurality of prefetched blocks, based on the edges' remaining lives stored on an edge-by-edge basis in the tool information memory and the generated internal information.

In this way, the numerical control device 10 can control a cycle time of machining in which a multi-edge tool is used, even if one of the edges of the multi-edge tool reaches its end-of-life.

In a case where two or more multi-edge tools of the same tool type number are available and the available multi-edge tools have an edge that will not be designated during the execution of at least the plurality of prefetched blocks, the numerical control device 10 preferentially uses one multi-edge tool in which the undesignated edge has reached the end-of-life. Thus, the numerical control device 10 can make full use of each edge of the multi-edge tool without wasting it, thereby enabling a reduction of the costs.

One embodiment has been described in the foregoing. However, the numerical control device 10 is not limited to the above-described embodiment, and encompasses modifications and improvements within a range where the object of the present disclosure can be achieved.

In the embodiment described above, the NC command decoding process shown in FIG. 5 and the NC command execution process shown in FIG. 11 are performed sequentially. However, this is a non-limiting example, and these processes may be performed in parallel.

Each of the functions of the numerical control device 10 according to the above-described embodiment can be implemented by hardware, software, or a combination thereof. Here, the implementation by software means that a computer reads and executes a program for the implementation.

The program can be stored in various types of non-temporary computer readable media (non-transitory computer readable media) and can be provided to a computer. The non-transitory computer readable media include various types of substantive recording media (tangible storage media). Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to the computer by way of various types of temporary computer-readable media (transitory computer readable media). Examples of the transitory computer readable media include an electrical signal, an optical signal, and an electromagnetic wave. The transitory computer readable medium can provide a program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the numerical control device of the present disclosure encompasses various embodiments having the following features:

(1) The numerical control device 10 of the present disclosure is intended for a machine tool 20 that machines a workpiece using a multi-edge tool including a plurality of edges of different specifications, the numerical control device 10 including: a tool information memory 200 that stores edge type numbers in association with tool type numbers, the edge type numbers identifying edge types of the edges, and the tool type number identifying tool types of tools; a tool type-edge type selection command decoding unit 111 that prefetches a plurality of blocks included in a machining program 30, decodes a tool type selection command for selecting one of the tool types in the plurality of prefetched blocks and/or an edge type selection command for selecting one of the edge types in the plurality of prefetched blocks, and generates internal information including the tool type selection command and/or the edge type selection command that have been decoded; and a tool selection unit 120 that selects one tool with which the number of times of tool replacement is minimized during execution of at least the plurality of prefetched blocks, based on remaining lives of the edges stored on an edge-by-edge basis in the tool information memory 200 and the internal information generated by the tool type-edge type selection command decoding unit 111.

The numerical control device 10 can control a cycle time of machining in which the multi-edge tool is used, even if any edge of the multi-tool edge reaches its end-of-life.

(2) In the numerical control device 10 according to (1), when it is determined that machining other than continuous machining using all the edges of the multi-edge tool is to be performed, the tool selection unit 120 may preferentially select one tool having an edge which has reached end-of-life.

With this feature, the numerical control device 10 can make full use of each edge of the multi-edge tool without wasting it, thereby enabling a reduction of the costs.

(3) In the numerical control device 10 according to (1) or (2), the multi-edge tool may be a lathe machining tool.

With this feature, the numerical control device 10 exerts the same effect as in (1) or (2).

(4) In the numerical control device 10 according to (1) or (2), the multi-edge tool may be a milling tool.

With this feature, the numerical control device 10 exerts the same effect as in (1) or (2).

EXPLANATION OF REFERENCE NUMERALS

10: Numerical Control Device
111: Tool Type-Edge Type Selection Command Decoder
120: Tool Selection Unit
200: Tool Information Memory

What is claimed is:

1. A numerical control device for a machine tool that machines a workpiece using a multi-edge tool including a plurality of edges of different specifications, the numerical control device comprising:

a tool information memory that stores edge type numbers in association with tool type numbers, the edge type numbers identifying edge types of the edges, and the tool type numbers identifying tool types of tools;

a tool type-edge type selection command decoding unit that prefetches a plurality of blocks included in a machining program, decodes a tool type selection command for selecting one of the tool types in the plurality of prefetched blocks and/or an edge type selection command for selecting one of the edge types in the plurality of prefetched blocks, and generates internal information including the tool type selection command and/or the edge type selection command that have been decoded; and a tool selection unit that selects one tool with which the number of times of tool replacement is minimized during execution of at least the plurality of prefetched blocks, based on remaining lives of the edges stored on an edge-by-edge basis in the tool information memory and the internal information generated by the tool type-edge type selection command decoding unit, wherein the numerical control device is configured to control a cycle time of machining based on the selected tool.

2. The numerical control device according to claim 1, wherein when it is determined that machining other than continuous machining using all the edges of the multi-edge tool is to be performed, the tool selection unit preferentially selects one tool having an edge which has reached end-of-life.

3. The numerical control device according to claim 1, wherein the multi-edge tool is a lathe machining tool.

4. The numerical control device according to claim 1, wherein the multi-edge tool is a milling tool.

* * * * *